(12) United States Patent
Deman et al.

(10) Patent No.: US 10,870,123 B2
(45) Date of Patent: Dec. 22, 2020

(54) DISPENSING PUMP WITH LOCKING STRUCTURES AND METHODS OF USING THE SAME

(71) Applicant: Silgan Dispensing Systems Corporation, Grandview, MO (US)

(72) Inventors: Eelco H. Deman, Waalwijk (NL); Jacqueline Jennette, Grandview, MO (US)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 16/163,231

(22) Filed: Oct. 17, 2018

(65) Prior Publication Data
US 2019/0054486 A1 Feb. 21, 2019

Related U.S. Application Data

(63) Continuation-in-part of application No. 15/861,108, filed on Jan. 3, 2018, now Pat. No. 10,138,971.

(51) Int. Cl.
*B05B 11/00* (2006.01)
*F16F 1/36* (2006.01)
(Continued)

(52) U.S. Cl.
CPC .......... *B05B 11/306* (2013.01); *B05B 11/305* (2013.01); *B05B 11/3059* (2013.01); *A47K 5/1205* (2013.01); *B05B 11/0037* (2013.01); *B05B 11/3001* (2013.01); *B05B 11/3023* (2013.01); *B05B 11/3047* (2013.01);
(Continued)

(58) Field of Classification Search
CPC .... F16F 1/377; F16F 1/373; F16F 1/44; F16F 1/3732; F16F 1/3605; F16F 1/36; B05B 11/305–306; B05B 11/3059; B05B 11/3076; B05B 11/0037; B05B 11/3001;
(Continued)

(56) References Cited

U.S. PATENT DOCUMENTS

| 1,169,863 A | 2/1916 | Peycke |
| 2,216,231 A | 10/1940 | Dentler |

(Continued)

FOREIGN PATENT DOCUMENTS

| DE | 202007002054 U1 | 8/2007 |
| JP | 2011240992 A | 12/2011 |
| WO | WO2017050394 A1 | 9/2015 |

*Primary Examiner* — Frederick C Nicolas
(74) *Attorney, Agent, or Firm* — Barlow, Josephs & Holmes, Ltd.

(57) ABSTRACT

A dispensing pump includes a spring assembly and a locking arrangement to prevent the dispensing head from being deployed and/or actuated during shipment, stocking and pre-purchase handling. The dispensing pump includes a pump base, and a dispensing head having a piston stem. The spring assembly includes a slotted tubular spring element and first and second loading cones received at opposing ends of the slotted tubular spring element. Various locking arrangements may include interacting rotatable lugs provided between the dispensing head and the pump base, snap beads to retain the piston and dispensing head in a secured shipping position, and recyclable locking rings disposed between the dispensing head and pump base which prevent an active dispensing head from being actuated.

17 Claims, 14 Drawing Sheets

(51) Int. Cl.
 *F16F 1/44* (2006.01)
 *F16F 1/373* (2006.01)
 *F16F 1/377* (2006.01)
 *A47K 5/12* (2006.01)

(52) U.S. Cl.
 CPC ....... *B05B 11/3074* (2013.01); *B05B 11/3076* (2013.01); *F16F 1/36* (2013.01); *F16F 1/3605* (2013.01); *F16F 1/373* (2013.01); *F16F 1/377* (2013.01); *F16F 1/3732* (2013.01); *F16F 1/44* (2013.01)

(58) Field of Classification Search
 CPC ............. B05B 11/3023; B05B 11/3047; B05B 11/3074; A47K 5/1205
 See application file for complete search history.

(56) References Cited

U.S. PATENT DOCUMENTS

| | | |
|---|---|---|
| 2,254,781 A | 9/1941 | Rabbitt |
| 2,289,790 A | 7/1942 | Light |
| 2,570,371 A | 10/1951 | O'Connor |
| 2,591,922 A | 4/1952 | Dath |
| 2,724,588 A | 11/1955 | Sheets |
| 3,285,594 A | 11/1966 | LaBelle |
| 3,452,905 A | 7/1969 | Micallef |
| 3,624,764 A | 11/1971 | Goben |
| 3,866,724 A | 2/1975 | Hollnagel |
| 4,010,940 A | 3/1977 | Freyler |
| 4,260,143 A | 4/1981 | Kliger |
| 5,011,046 A | 4/1991 | Graf |
| 5,030,490 A | 7/1991 | Bronowicki |
| 5,174,421 A | 12/1992 | Rink |
| 5,419,416 A | 5/1995 | Mayashita |
| 5,447,257 A | 9/1995 | Dark |
| 5,518,377 A | 5/1996 | Bougamont |
| 5,651,536 A | 7/1997 | Daul |
| 6,045,119 A | 4/2000 | Erb |
| 6,053,371 A | 4/2000 | Durliat |
| 6,223,954 B1 | 5/2001 | Carow |
| 6,401,752 B1 | 6/2002 | Blackbourn |
| 6,470,910 B2 | 10/2002 | Blackbourn |
| 6,520,385 B2 | 2/2003 | Bonningue |
| 6,986,444 B2 | 1/2006 | Fuchs |
| 7,025,233 B2 | 4/2006 | Masuda |
| 7,299,949 B2 | 11/2007 | Greiner-Perth |
| 7,513,395 B2 | 4/2009 | Labinski |
| 8,113,239 B2 | 2/2012 | Richards |
| 8,402,999 B2 | 3/2013 | Nini |
| 8,464,917 B2 | 6/2013 | Nini |
| 8,474,664 B2 | 7/2013 | Ophardt |
| 9,539,597 B2 | 1/2017 | Ding |
| 9,580,292 B2 | 2/2017 | Smith et al. |
| 10,138,971 B1 | 11/2018 | Deman |
| 10,495,173 B2 * | 12/2019 | Deman ................ A47K 5/1205 |
| 10,526,191 B1 | 1/2020 | Driskell et al. |
| 2006/0208008 A1 | 9/2006 | Sweeton |
| 2007/0045349 A1 | 3/2007 | Foster |
| 2007/0119864 A1 | 5/2007 | Tsai |
| 2013/0230423 A1 | 9/2013 | Llesera |
| 2013/0341366 A1 | 12/2013 | Campbell |
| 2015/0069094 A1 | 3/2015 | Maher et al. |
| 2016/0201755 A1 | 7/2016 | Hufenbach |
| 2016/0332181 A1 | 11/2016 | DeMan |
| 2017/0128966 A1 | 5/2017 | Law et al. |
| 2017/0190562 A1 | 7/2017 | Trettin |
| 2017/0247239 A1 | 8/2017 | Nini |
| 2018/0186522 A1 | 7/2018 | Kieras et al. |
| 2018/0188092 A1 | 7/2018 | Kieras et al. |
| 2019/0054486 A1 | 2/2019 | Deman et al. |

\* cited by examiner

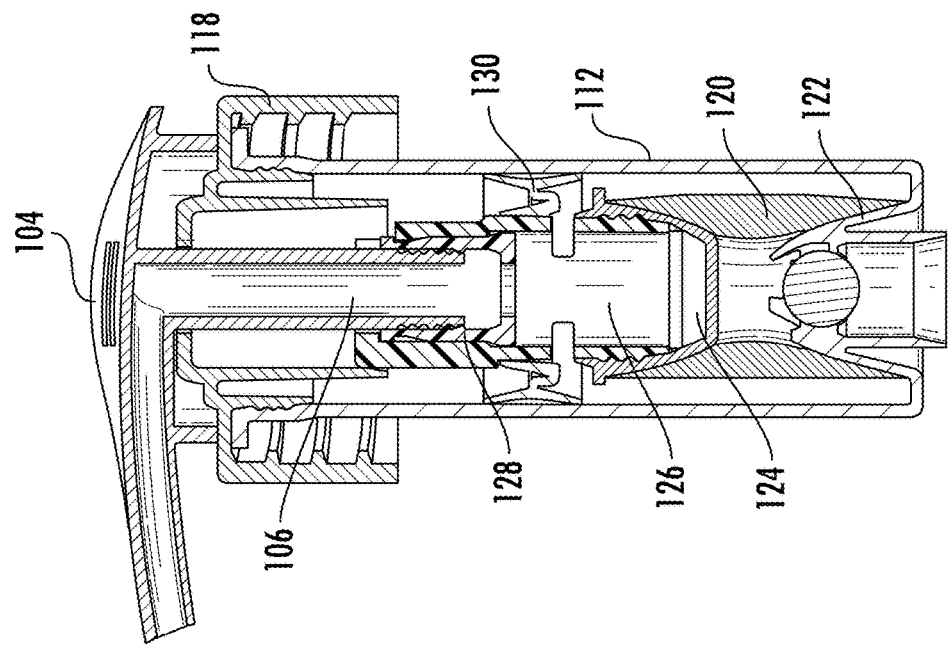
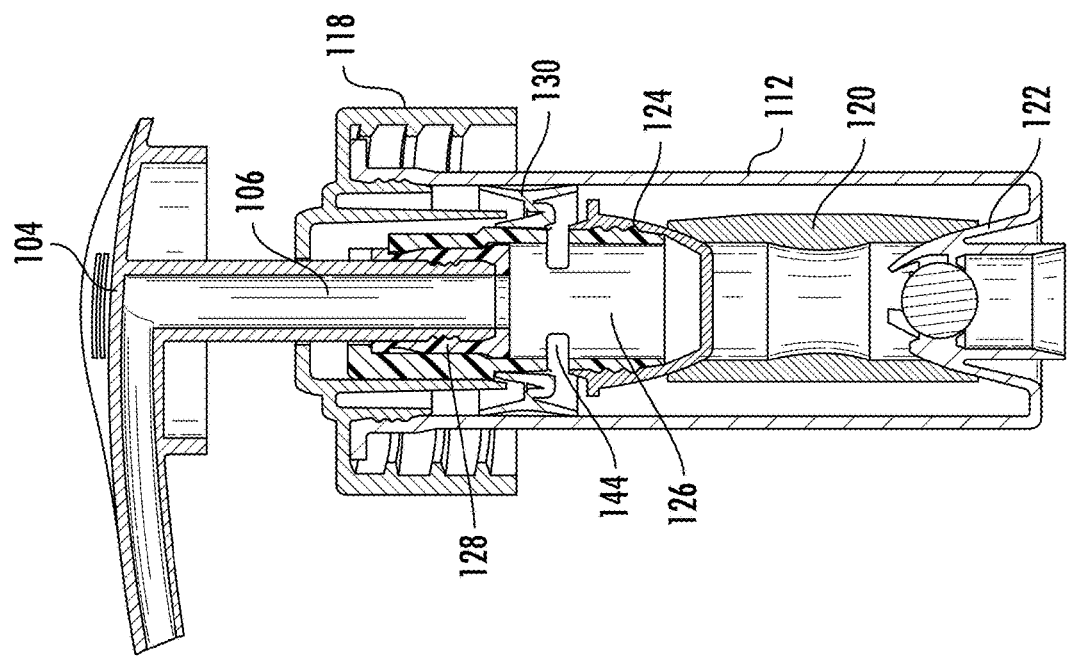

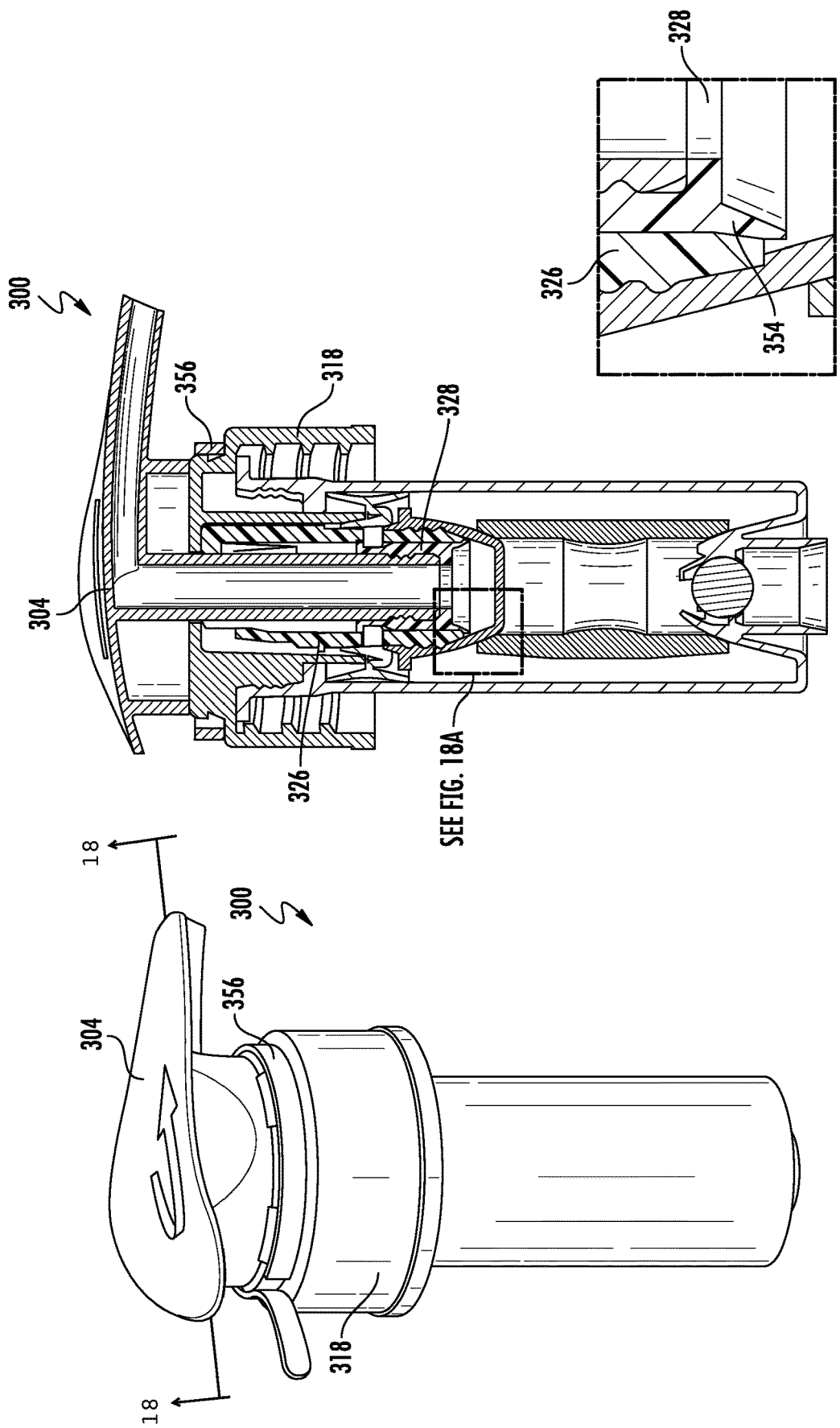

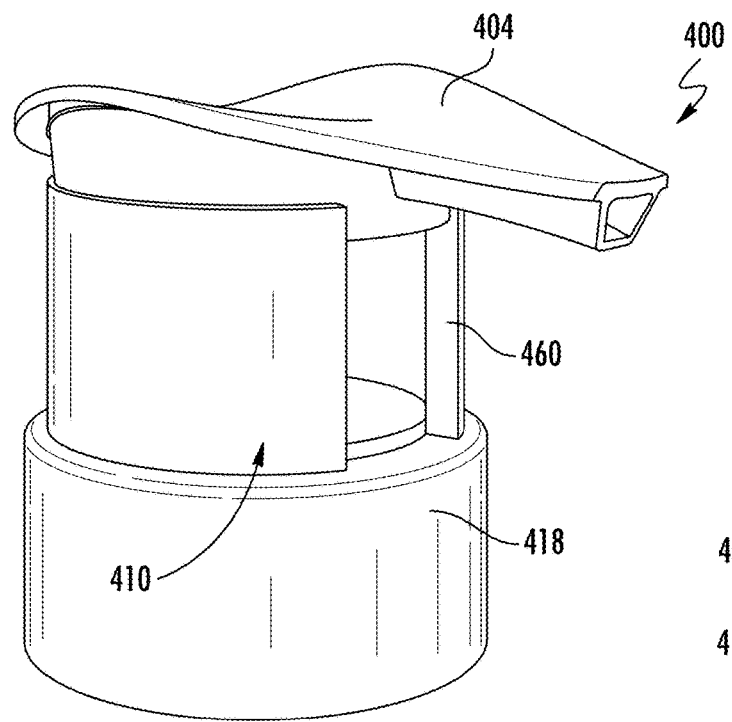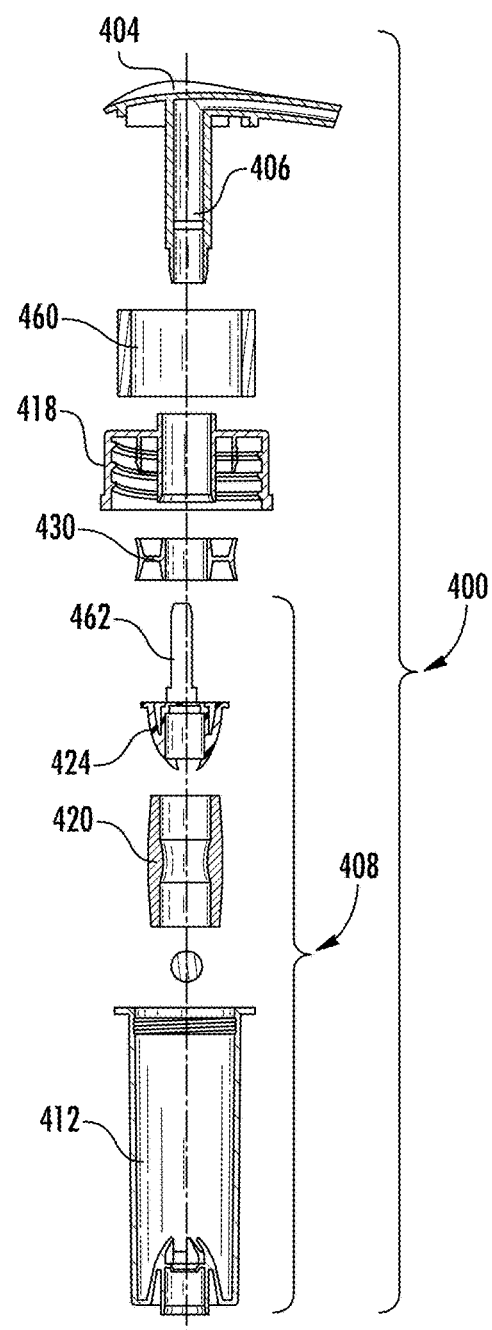
FIG. 19
FIG. 20

DISPENSING PUMP WITH LOCKING STRUCTURES AND METHODS OF USING THE SAME

CROSS-REFERENCE TO RELATED APPLICATIONS

This application is a continuation-in-part of U.S. application Ser. No. 15/861,108, filed Jan. 3, 2018, the entire contents of which is incorporated herein by reference.

BACKGROUND OF THE DISCLOSURE

(1) Field of the Invention

The present invention generally relates to dispensing pumps for liquids, viscous flowable materials, foams, gels, etc. and more particularly to a dispensing pump with recyclable spring and locking components.

(2) Description of Related Art

Dispensing pumps for various liquids, lotions, foams, gels, etc. are known in the art. They generally comprise a body portion which is seated on the neck of a container, a co-acting nozzle portion which slides relative to the body portion, and a spring structure which biases the co-acting nozzle portion to its normal rest position. To dispense the material in the container, the user manually depresses the nozzle which forces the material from the inside of the body portion outwardly through the nozzle. When the nozzle is released, the spring forces the nozzle portion back to its normal resting position. Most of the pump system components are typically formed from polymer materials, with the exception of the spring, which is typically formed from metal. The plastic pump components are easily recyclable. However, the presence of the metal spring in the pump assemblies has been found to impede or slow the recycling process due to the need to separate the metal spring from the other plastic components.

Additionally, these types of pumps are sometimes shipped in a locked condition to prevent the dispensing head from being actuated during shipping, stocking and pre-purchase handling. In some embodiments, the dispensing head is depressed inwardly and locked in place by various means. This reduces shipping space and prevents actuator, but some components may not be recyclable. Some embodiments are shipped with the dispensing head in the active position but include a shroud or other tamper evident cover to prevent the dispensing head from being actuated before purchase. These systems add extra components and cost. There is thus an ongoing need in the industry for dispensing pump systems including pump, spring and locking systems which are entirely recyclable.

SUMMARY OF THE INVENTION

Exemplary embodiments of a dispensing pump for liquids, viscous materials, foams, gels, etc. include a polymer compression spring assembly and polymer or paper locking structures allowing the pump to be more easily recycled.

An exemplary embodiment of the dispensing pump generally includes a pump base, a dispensing head having an associated piston stem, a compression spring and a releasable lock structure coupled between the pump head and the dispensing base.

The pump base may include an accumulator cup having a clip tube port within a bottom wall, and further having a ball valve within said clip tube port. The pump base may further include a closure ring which secures the accumulator cup to a neck of a container.

The dispensing head includes an integral piston stem which is guided within the pump base and has a terminal end which extends into the accumulator.

A piston seal received about the piston stem and forms a seal with inner walls of the accumulator for pumping.

The spring assembly may comprise a slotted tubular spring element formed from a tensile polymer material and lower and upper loading cones received at opposing lower and upper ends of the spring element.

In some embodiments, the lower loading cone is formed with the bottom wall of the accumulator and the upper loading cone is carried at a terminal end of the piston stem where it is movable with the dispensing head relative to the first loading cone.

In some embodiments, the releasable lock may comprise a guide tube and sliding plug which are coupled between the piston stem and the spring assembly. The guide tube is secured within the upper loading cone while the stem plug is received on a terminal end of the piston stem. The plug is slidably received within the guide tube and is slidably movable relative to the guide tube between a locked position when the dispensing head is retracted and a deployed position when the dispensing head is extended.

In some embodiments, the piston stem and attached piston stem plug are retained in the locked (retracted) position by friction between the lower portions of the plug and guide tube, and are locked in the deployed position by interfitting tabs at the upper ends thereof.

In use, the dispensing pump is shipped with the dispensing head in the retracted position. Upon purchase, the end user will grasp the dispensing head and pull the head upwardly where the plug slides upwardly within the guide tube and at the upper extended position becomes locked in the extended or deployed position by engagement of the interfitting tabs.

In some embodiments, the piston plug includes an outwardly extending snap bead on a lower peripheral edge thereof, and the snap bead engaged with a lower peripheral edge of the guide tube to retain the piston stem plug and piston stem in the locked position. The snap bead increases the unlocking force required to pull the dispensing head upwardly to the deployed position, i.e. the added force required to force the snap bead over the lower peripheral edge of the guide tube.

In some embodiments, the piston plug includes a sealing rim which provides a slightly higher level of friction within the guide tube for retention in the retracted position, and may also be paired with a frangible tear strip engaged between the closure ring and the dispensing head. Once the tear strip is removed, the dispensing head may be more easily pulled upward to the deployed or extended position.

In some embodiments, the closure ring may include an enlarged shoulder to help prevent inadvertent deployment of the dispensing head. In shipping and pre-purchase handling situations, the enlarged shoulder guides the user toward grasping the closure ring rather than the dispensing head.

In some embodiments, the dispensing pump may further include a chaplet ring secured to the dispensing head where the chaplet ring and closure ring include mating anti-rotation features that prevent the dispensing head from rotating relative to the closure prior to deployment of the dispensing head.

In some embodiments, the locking structure may comprise a slotted tubular band captured between the closure ring and the dispensing head. The slotted tubular band releasably maintains the dispensing head in the extended position so that it cannot be inadvertently actuated. The slotted band may comprise a paper, paper board or other paper based material which is readily recyclable. The slotted band may also comprise a plastic material which is also easily recycled.

In some embodiments, the locking structure may comprise a frangible tear band received between the closure ring and the dispensing head.

In other exemplary embodiments, the locking structure may comprise a chaplet received within the closure ring and locking lugs received around the piston stem of the dispensing head. The chaplet may include a plurality of axially extending guide slots which guide axial movement of the dispensing head between the extended and retracted positions. In use, the dispensing head and the locking lugs are rotatable relative to the chaplet between a locked position and an unlocked position. The guide lugs and chaplet including mating surfaces which are engaged in the locked position and disengaged in the unlocked position.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

FIGS. 9 and 10 are cross-sectional views showing a pumping cycle of the dispensing head;

FIG. 17 is a perspective view of an exemplary embodiment including a tear strip;

FIG. 18 is a cross-sectional view thereof taken along line 18-18 of FIG. 17;

FIG. 18A is an enlarged view taken from FIG. 18;

FIG. 19 is a perspective view of a further exemplary embodiment including a slotted tubular locking ring;

FIG. 20 is an exploded cross-sectional view of the entire assembly thereof;

DETAILED DESCRIPTION OF THE INVENTION

Figure 1:
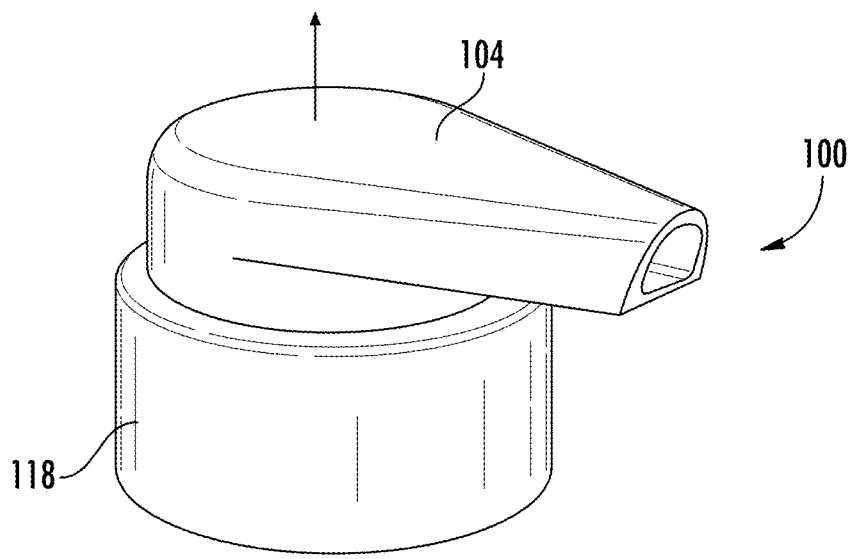
FIGS. 1 and 2 illustrate perspective views of an exemplary dispensing head in the shipping retracted position and deployed to the extended use position.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Referring now to the drawings, a first exemplary embodiment of the present dispensing pump is generally indicated at 100 in FIG. 1-11.

An exemplary embodiment of the dispensing pump 100 generally includes a pump base 102, a dispensing head 104 having an associated piston stem 106, a compression spring assembly 108 and a releasable lock structure 110 coupled between the dispensing head 104 and the pump base 102.

Figure 2:
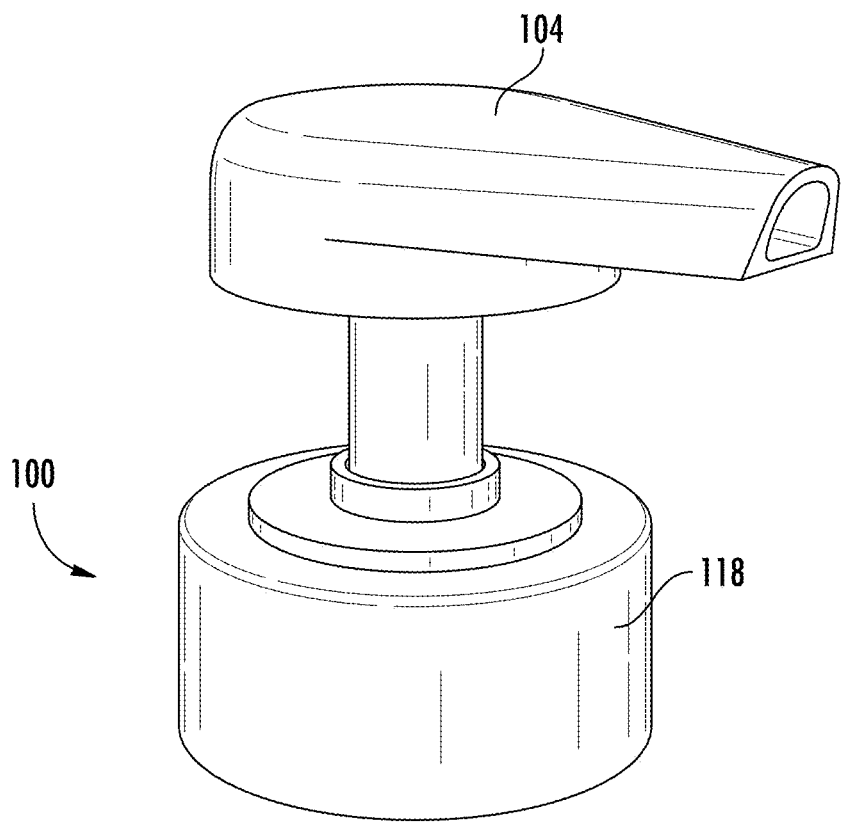
Figure 3:
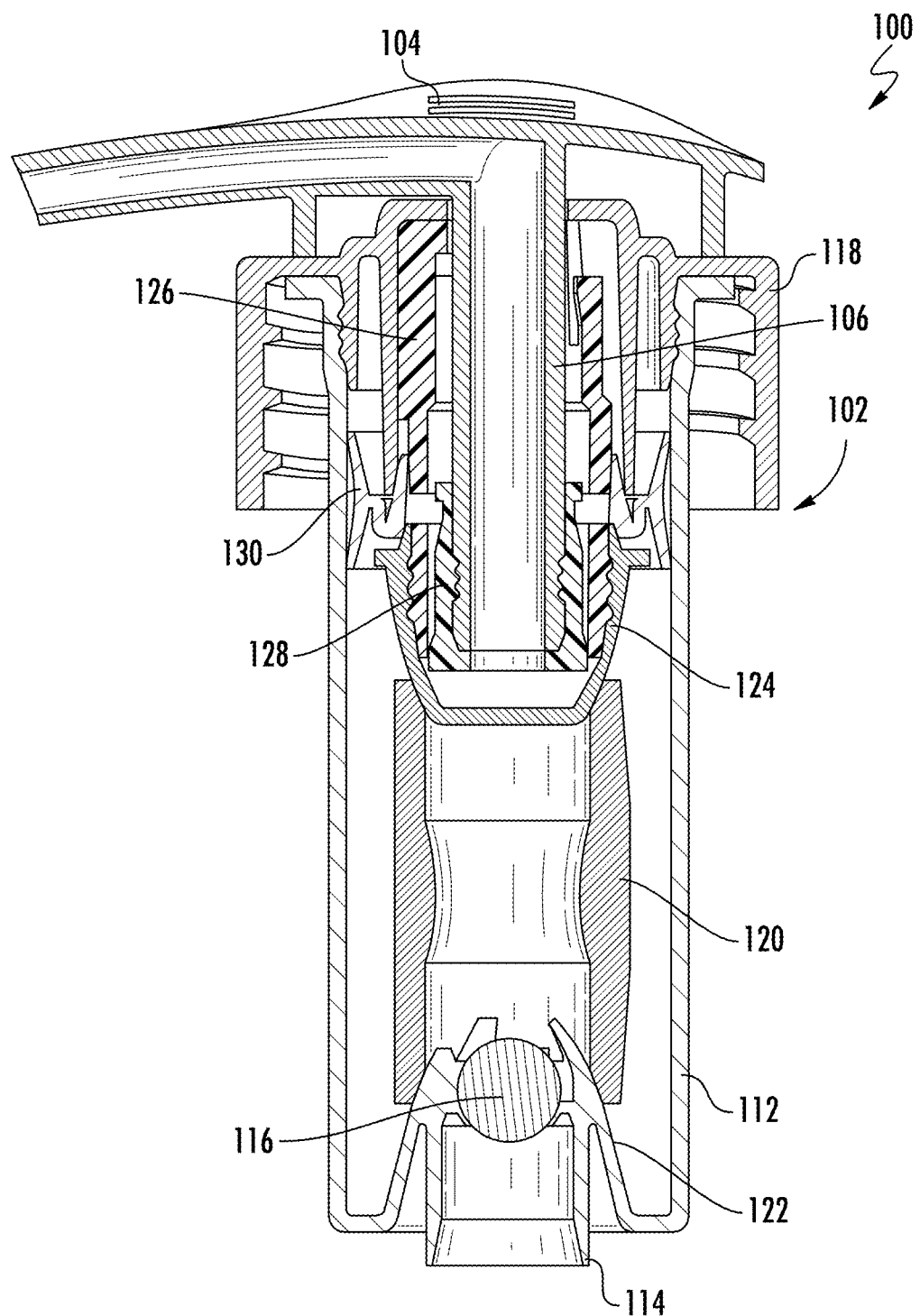
FIG. 3 is a cross-sectional view of an exemplary dispensing pump in accordance with some embodiments of the invention.

FIGS. 1 and 2 generally illustrate the unlocking motion of the dispensing head 104 relative to the pump base 102 which motion is an upward pulling action rather than the conventional rotation.

The pump base 102 may include an accumulator cup 112 having a clip tube port 114 within a bottom wall, and further having a ball valve 116 within the clip tube port 114. The pump base 102 may further include a threaded or snap mounted closure ring 118 which secures the accumulator cup 112 to a neck of a container (not shown).

The dispensing head 104 includes an integral piston stem 106 which is guided within the pump base 102 and has a terminal end which extends into the accumulator 112.

The spring assembly 108 may comprise a slotted tubular spring element 120 formed from a tensile polymer material, a lower loading cone 122 and an upper loading cone 124 received at opposing lower and upper ends of the spring element 120. Further details of the tubular spring element and loading cones can be found in claimed priority application U.S. application Ser. No. 15/861,108, particularly FIGS. 14-21 and paragraph 54 of the specification.

Figure 4:
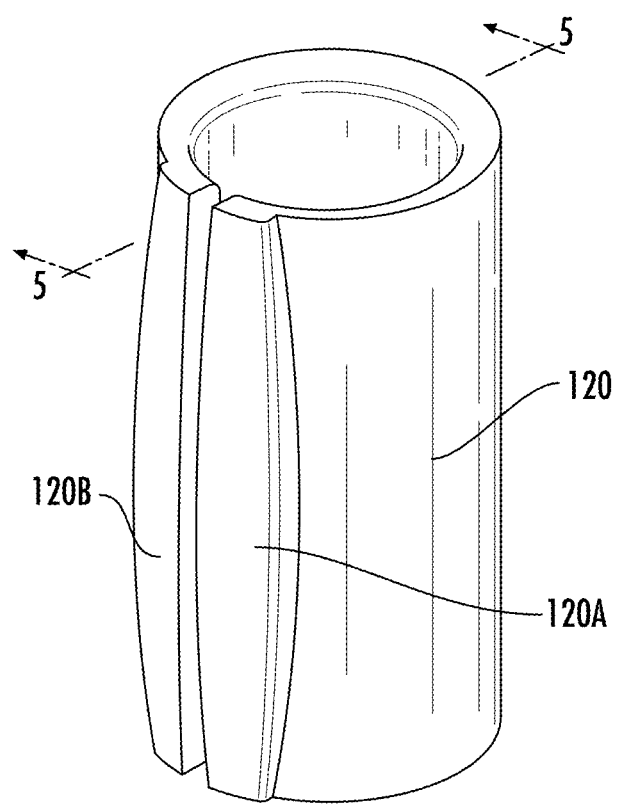
FIG. 4 is a perspective view of the compression spring thereof.
Figure 5:
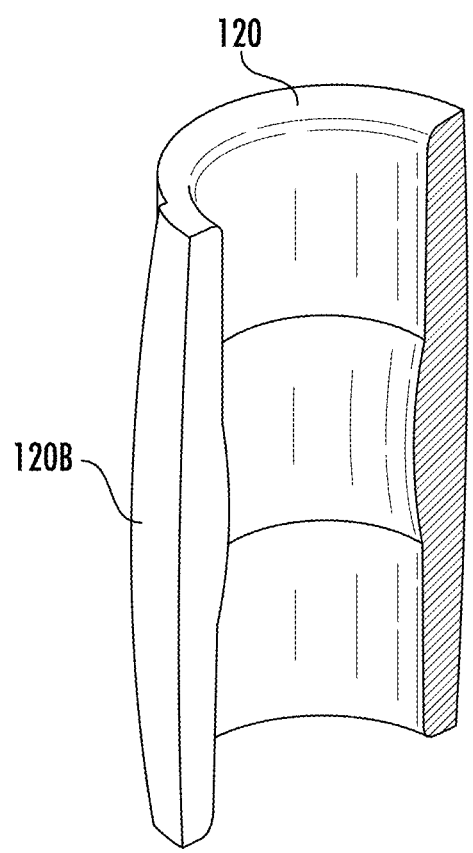
FIG. 5 is a cross-sectional view thereof taken along line 5-5 of FIG. 4.

Referring to FIGS. 4 and 5 of the present application, the slotted tubular spring element 120 is generally cylindrical in shape and has a non-uniform wall thickness (best illustrated in FIG. 5). The spring element 120 includes a single longitudinal slot which extends the entire length of the tube to define parallel opposing slot edges. The slot allows the element 120 to expand radially upon the application of an axial force at the first and second ends thereof. The spring element 120 may include strain reducing ribs 120A, 120B extending along the opposing edges of the longitudinal slot. The ribs may include symmetrical convex surfaces extending both radially outward and circumferentially outward from the slot edges. The illustrated embodiment further includes a first thinner wall thickness at the slot edges adjacent the strain ribs 120A, 120B and a second thicker wall thickness diametrically opposed from the slot edges (See FIG. 5). The arcuate surfaces along with the increasing wall thickness moving away from the slot edges more evenly distributes strain throughout the entire spring element and extends the life cycle of the spring element. Still referring to FIG. 5, the spring also has a tapered thickness from the top and bottom towards the middle. A thicker middle bulge can be seen in the FIG. 5 cross-section as well as the other cross-sections. Adding the extra material on the inner surface of the spring 120 increases the strength without increasing the maximum diameter of the spring when compressed within the accumulator.

In some embodiments, the lower loading cone 120 is formed with the bottom wall of the accumulator 112 and the upper loading cone 124 is carried at a terminal end of the piston stem 106 where it is movable with the dispensing head 104 relative to the lower loading cone 122.

In some embodiments, the releasable lock mechanism 110 may comprise a guide tube 126 and sliding stem plug 128 which are coupled between the piston stem 106 and the spring assembly 108. More specifically, the lower end of the guide tube 126 is secured within the upper loading cone 124 while the stem plug 128 is snap received on a terminal end of the piston stem 106. The upper loading cone 124 may be molded as a cup shaped component with an open top, a hollow interior and interior ribs which are snap received onto corresponding ridges on the lower end portion of the guide tube 126.

Figure 8:
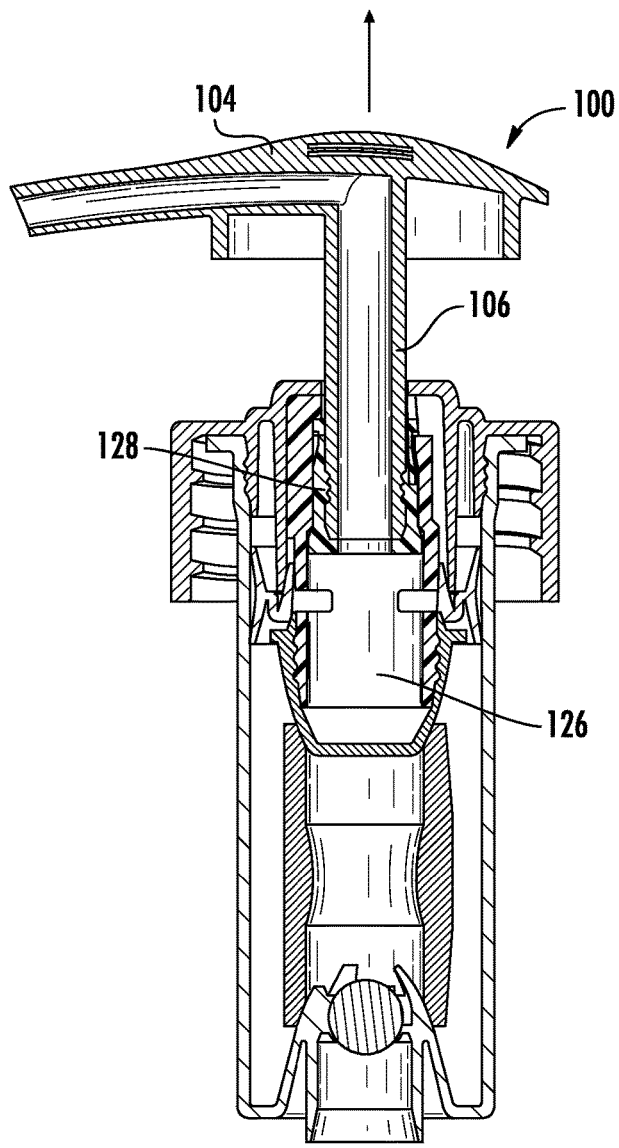
FIG. 8 is a cross-sectional view of the dispensing pump extended to the operative dispensing position.
Figure 11:
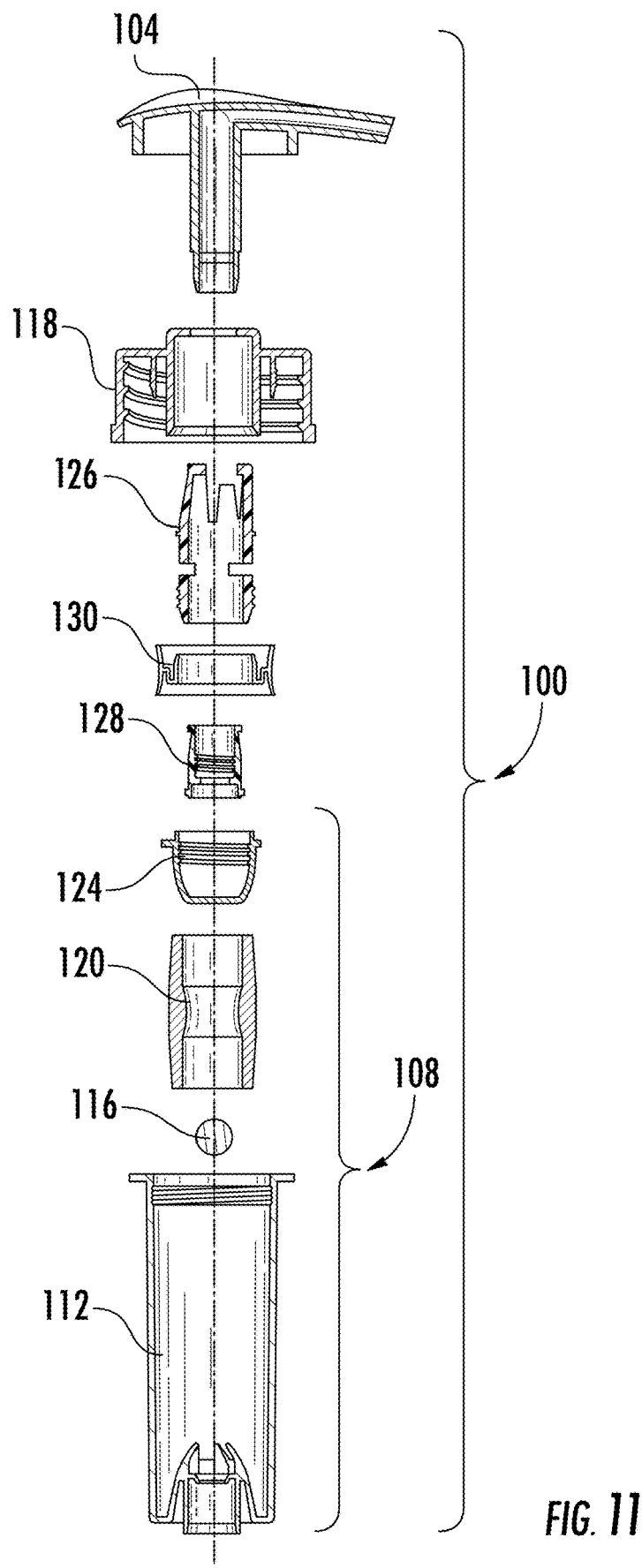
FIG. 11 is an exploded cross-sectional view thereof.

The plug 128 is slidably received within the guide tube 126 and is slidably movable relative to the guide tube 126 between a locked position when the dispensing head 104 is retracted (FIGS. 1 and 3) and a deployed position when the dispensing head 104 is extended (FIG. 8).

A piston seal 130 received about a central portion of the guide tube 126 and forms a seal with inner walls of the accumulator 112 for pumping.

Figure 6:
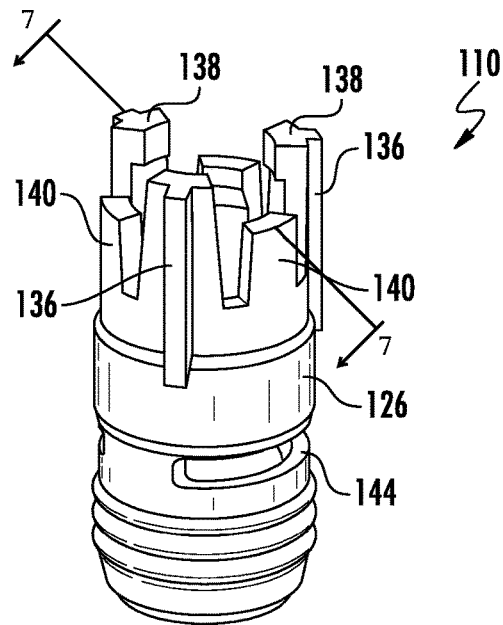
FIG. 6 is a perspective view of the guide tube and piston plug thereof.
Figure 7:
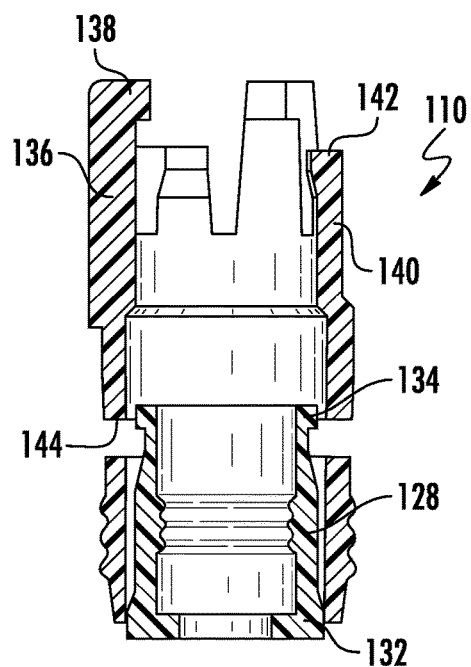
FIG. 7 is a cross-sectional view thereof taken along line 7-7 of FIG. 6.

Referring to FIGS. 6-8, in some embodiments, the piston stem 106 and attached piston stem plug 128 are retained in the locked position (retracted shipping position) (FIGS. 1 and 3) by friction between the lower portions of the plug 128 and guide tube 126, and are locked in the deployed position by interfitting tab structures at the upper ends thereof. As best seen in FIG. 5, the lower end of the stem plug 128 has a shoulder 132 with a cylindrical outer surface that frictionally engages with an inner cylindrical wall of the guide tube 126. The upper end of the stem plug 128 has a smaller diameter with an undercut locking rim 134. The upper end of the guide tube 126 includes a plurality of extension arms 136 with stop shoulders 138. These stop shoulders 138 engage with the upper locking rim 134 of the stem plug 128 and act as an upper stop limit. The upper end of the guide tube 126 further including a plurality of shorter spring fingers 140 with ramped locking tabs 142.

In use, the dispensing pump 100 is shipped with the dispensing head 104 in the retracted position (FIGS. 1, 3, 6 and 7). Upon purchase, the end user may grasp the dispensing head 104 and pull the head upwardly (FIGS. 2 and 8) where the plug 128 slides upwardly within the guide tube 126 and at the upper extended position becomes locked in the extended or deployed position by engagement of the undercut locking rim 134 with the spring fingers 140. The ramped surfaces 142 deflect the fingers slightly outward and then snap back to engage the undercut rim 134. This now allows the stem plug 128, guide tube 126, piston seal 130 and upper loading cone 124 to move as an integrated unit for pumping.

Referring to FIGS. 6-8, a dispensing cycle is illustrated with the dispensing head 104 in the ready (unlocked) extended position in FIG. 8, a partial downward compression in FIG. 9, and the dispensing head 104 fully actuated downwardly in FIG. 10. Downward compression of the dispensing head 104 and piston stem 106 causes a corresponding downward compression of the upper loading cone 124, radial expansion of the slotted tubular spring element 120, and opening of a dispensing passage 144 in the guide tube 126. In FIG. 10, further downward compression of the dispensing head 104 moves both the loading cone 124 and the piston seal 130 providing pumping action. Material within the accumulator 112 is forced into the interior of the guide tube 126, upward into the interior of the piston stem 106 and upwardly into the dispensing head 104. Subsequent release of the dispensing head 104 frees the spring element 120 to radially contract and create an upward axial force to return the dispensing head 104 back to its normal at rest position (FIG. 8).

Figure 12:
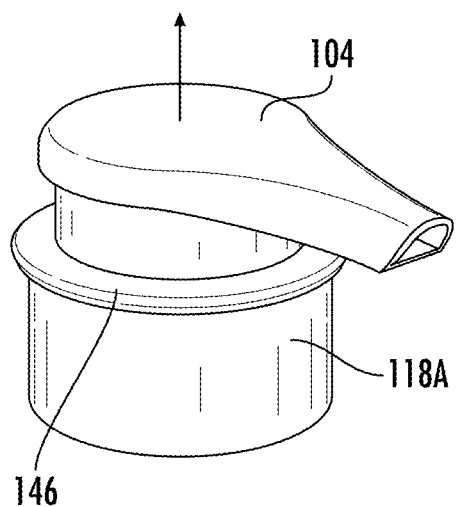
FIGS. 12 and 13 illustrate perspective views of another exemplary embodiment showing the closure ring with an enlarged interference ring.
Figure 13:
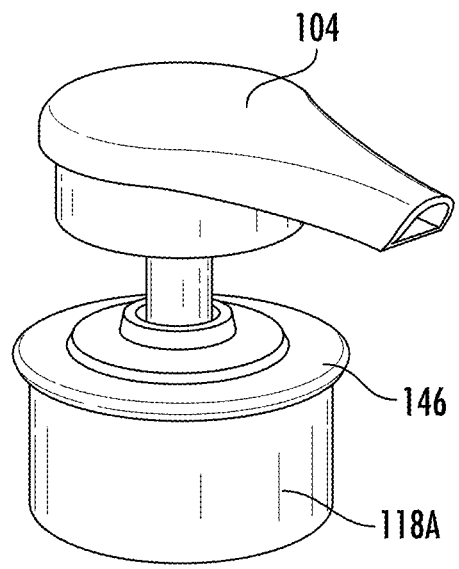

Turning to FIGS. 12 and 13, an embodiment of the closure ring 118A may include an enlarged shoulder 146 to help prevent inadvertent deployment of the dispensing head 104. In shipping and pre-purchase handling situations, the enlarged shoulder 146 guides the user toward grasping the closure ring 118A rather than the dispensing head 104 for handling of the assembly.

Figure 14:
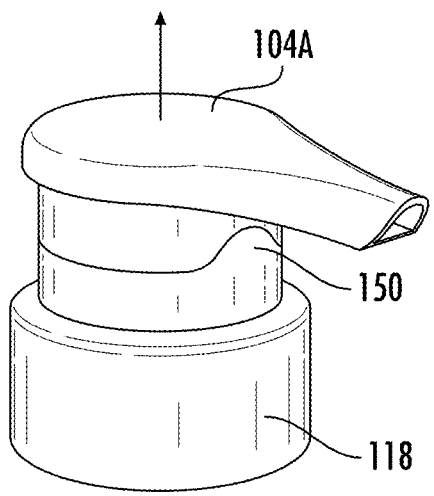
FIGS. 14 and 15 illustrate perspective view of yet another exemplary embodiment showing the closure ring and a chaplet with anti-rotation features.
Figure 15:
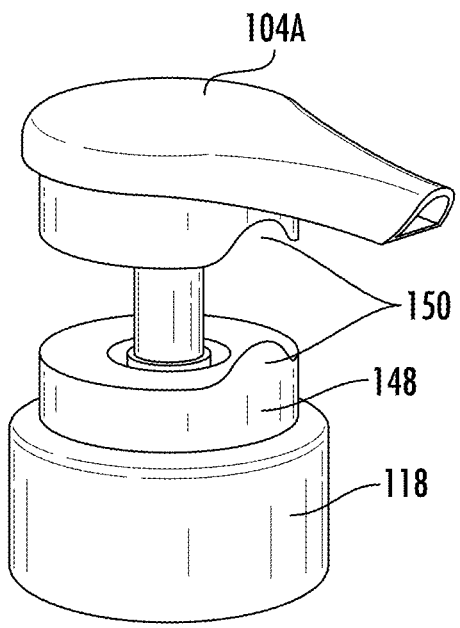

In some embodiments as shown in FIGS. 14 and 15, the dispensing pump 100 may further include a chaplet ring 148 secured to the dispensing head 104A where the chaplet ring 148 and dispensing head 104A also include mating anti-rotation features 150 that prevent the dispensing head 104A from rotating relative to the closure ring 118 prior to deployment of the dispensing head 104A.

Figures 16, 16A:
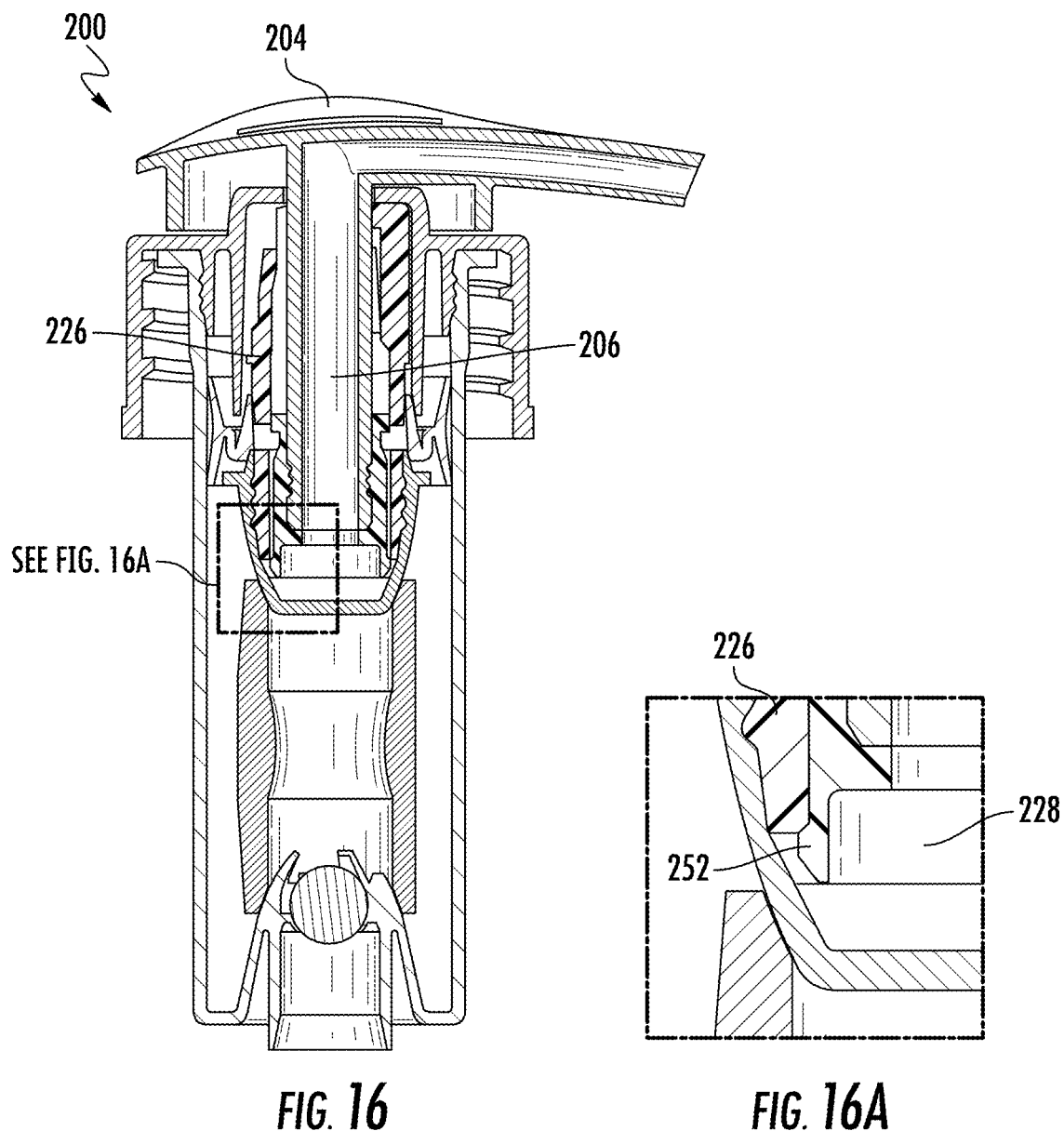
FIG. 16 is a cross-sectional view of another exemplary embodiment where the stem plug includes a snap bead for improved locking retention.
FIG. 16A is an enlarged view taken from FIG. 16.

As illustrated in FIGS. 16 and 16A, in another exemplary embodiment 200, the piston stem plug 228 includes an outwardly extending snap bead 252 on a lower peripheral edge thereof. During shipping, the snap bead 252 is engaged with a lower peripheral edge of the guide tube 226 to retain the piston stem plug 228 and piston stem 206 in the locked position. The snap bead 252 increases the unlocking force required to pull the dispensing head 204 upwardly to the deployed position, i.e. the added force required to force the snap bead 252 over the lower peripheral edge of the guide tube 226.

Turning to FIGS. 17, 18 and 18A, in another exemplary embodiment 300, the piston plug 328 may include a sealing rim 354 which provides a slightly higher level of friction within the guide tube 326 for better retention in the retracted position. This assembly 300 may also be paired with a frangible tear strip 356 engaged between the closure ring 318 and the dispensing head 304 to prevent accidental deployment of the dispensing head 304. Once the tear strip 356 is removed, the dispensing head 304 may be more easily pulled upward to the deployed or extended position.

Another exemplary embodiment 400 is illustrated in FIGS. 19 and 20. The pump assembly 400 generally comprises a dispensing head 404, an accumulator cup 412 and closure ring 418, spring assembly 408 with spring element 420 and piston seal 430 as previously described. A locking structure 410 may comprise a slotted tubular band 460 captured between the closure ring 418 and the dispensing head 404. The dispensing head 404 is shipped in the extended ready to pump position. However, the slotted tubular band 460 releasably maintains the dispensing head 404 in the extended position so that it cannot be inadvertently actuated during shipping and pre-purchase handling. In this regard, the pump assembly 400 does not include the previously described guide tube and stem plug. Rather, the upper loading cone 424 includes an extension 462 which is directly received into the piston stem 406 (best seen in FIG. 20).

The slotted band 460 may comprise paper, paper board or any other suitable paper-based or fiber-based material which is readily recyclable by the end consumer. The slotted band 460 may also comprise a plastic material which can be recycled.

Figure 21:
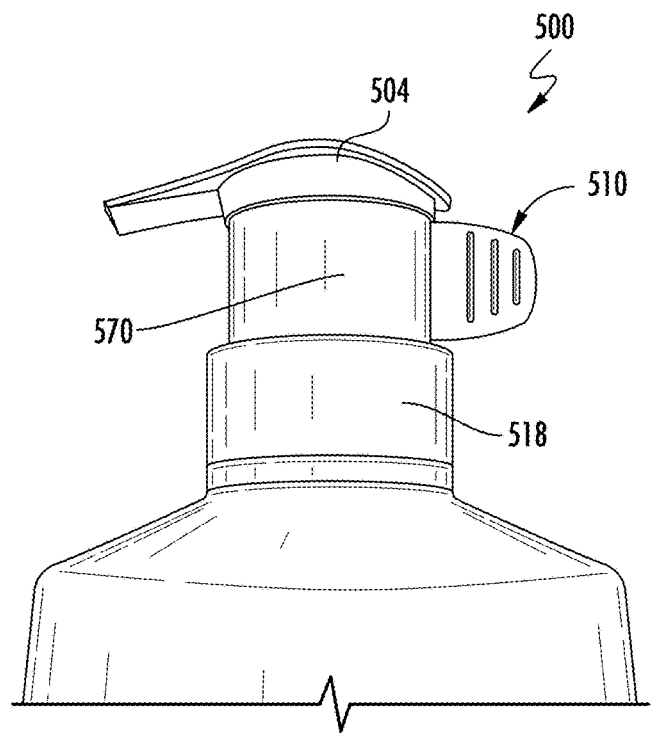
FIG. 21 is a perspective view of a still another exemplary embodiment including a tear away locking ring.
Figure 22:
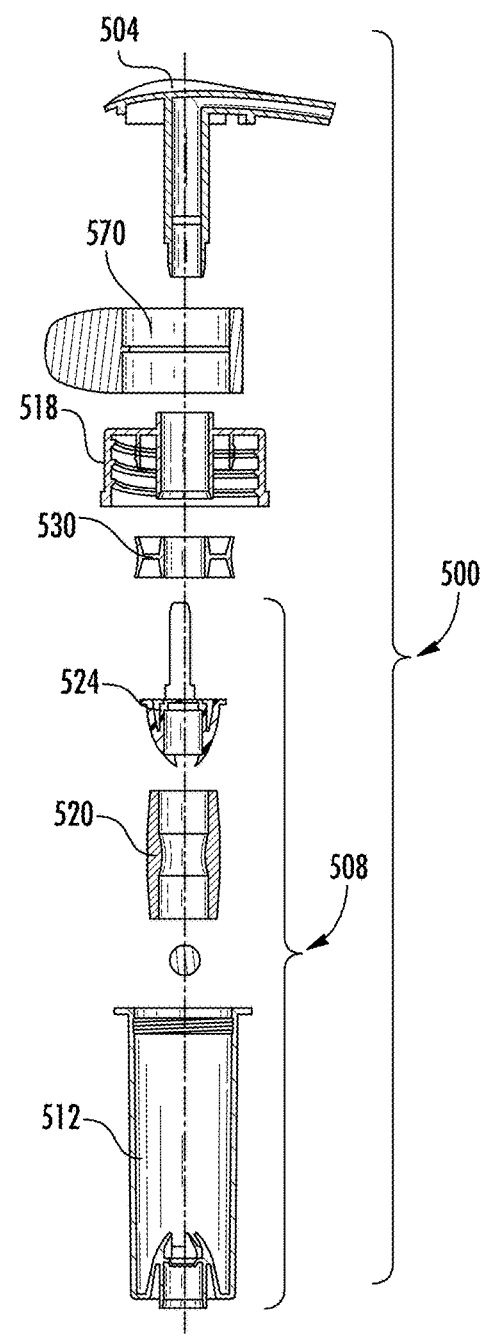
FIG. 22 is an exploded cross-sectional view of the entire assembly thereof.
Figure 23:
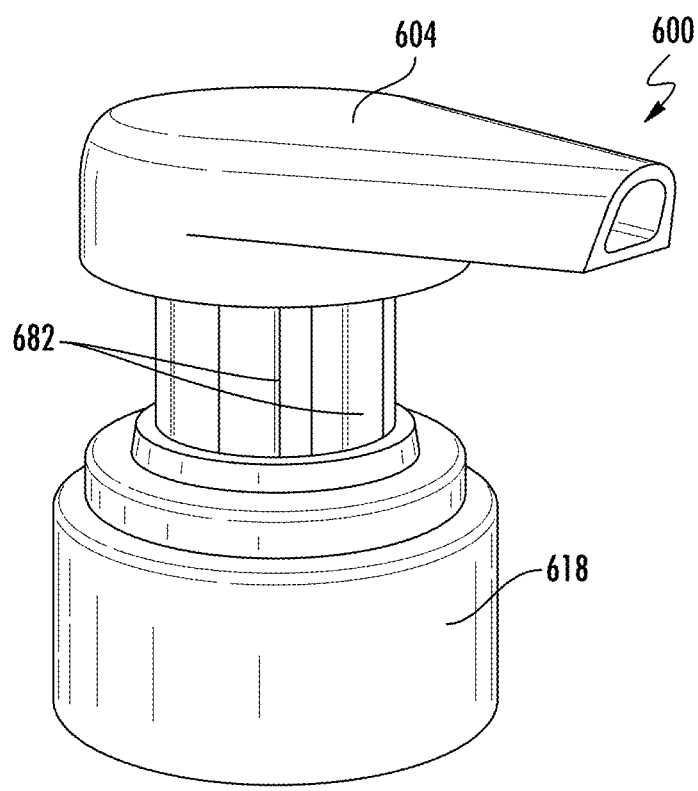
FIGS. 23 and 24 are perspective and side views of an exemplary embodiment including rotating locking lugs.
Figure 24:
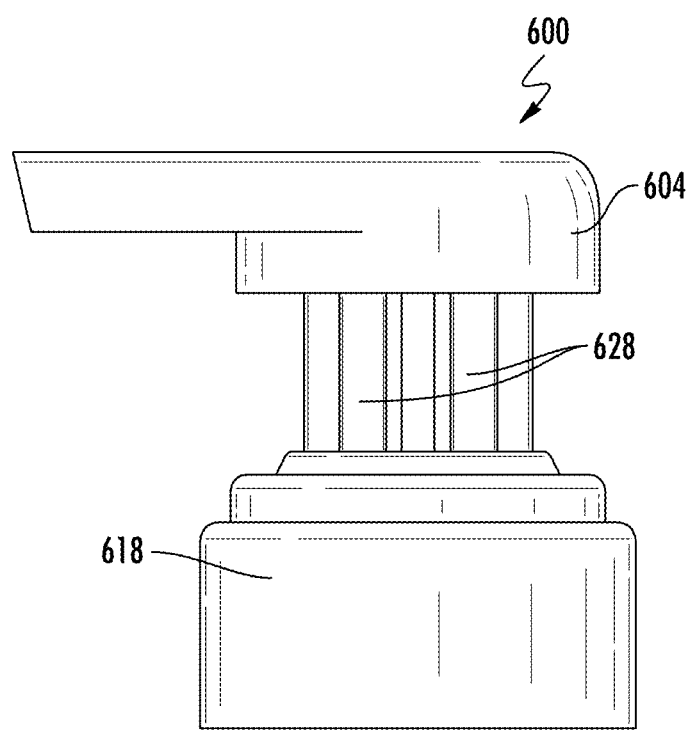
Figure 25:
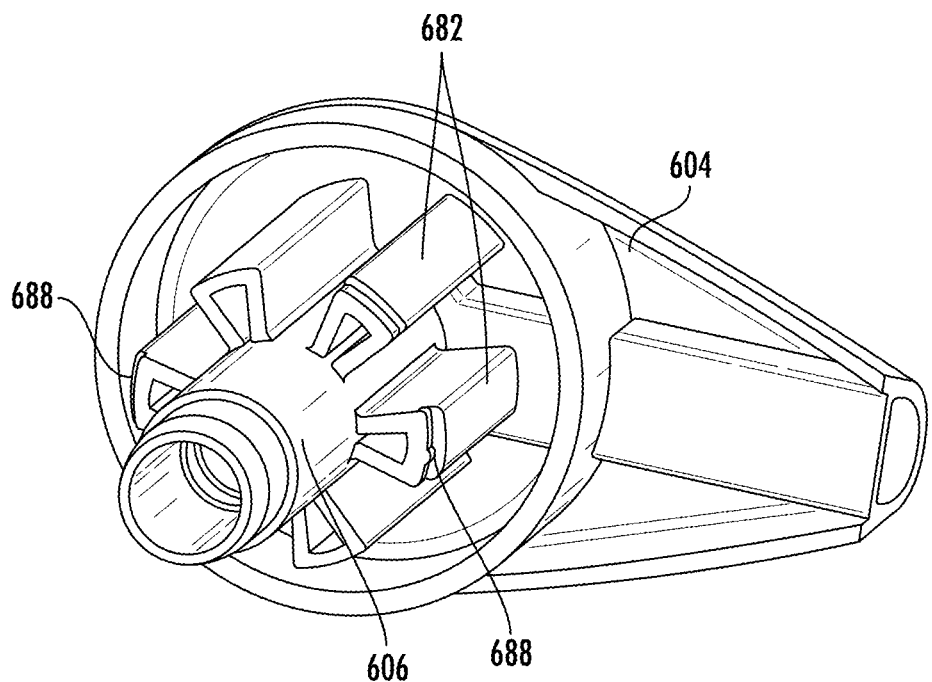
FIG. 25 is a bottom perspective view of the dispensing head showing the locking lugs.
Figure 26:
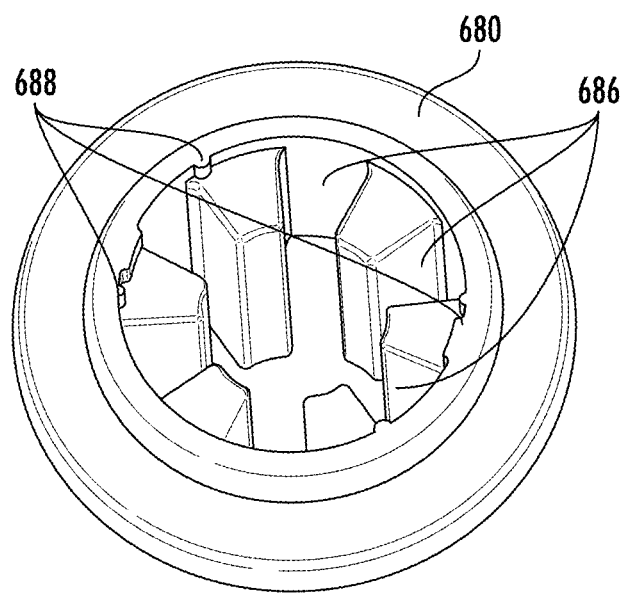
FIG. 26 is a top perspective view of the chaplet showing the locking slots.
Figure 27:
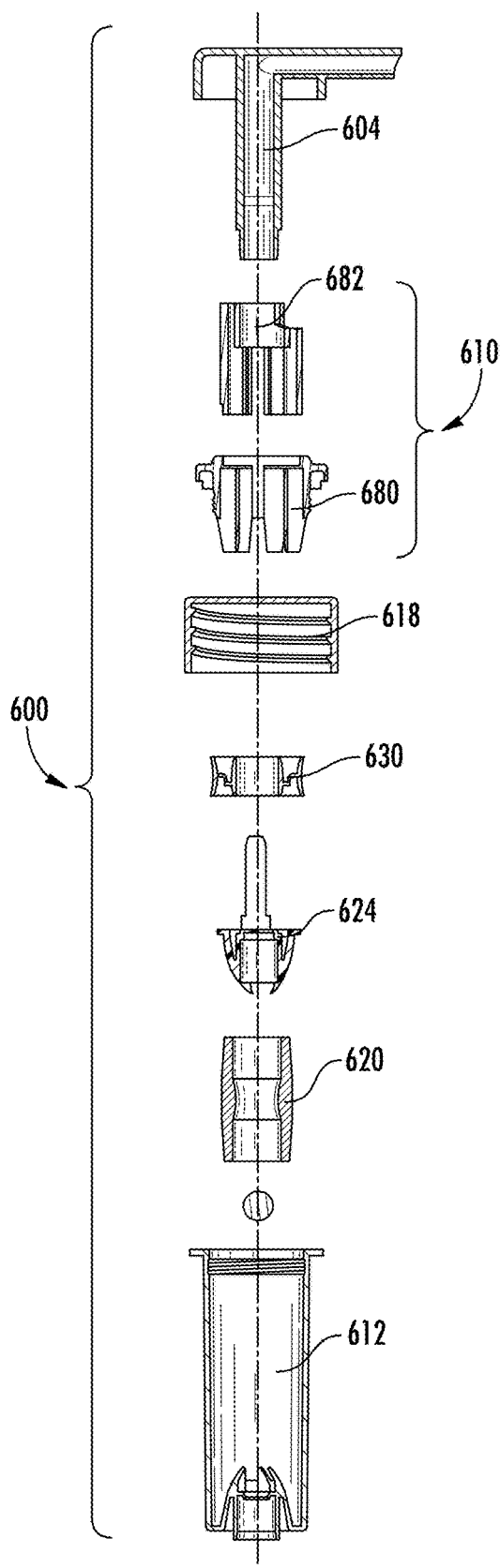
FIG. 27 is an exploded cross-sectional view of the entire assembly thereof.
Figure 28:
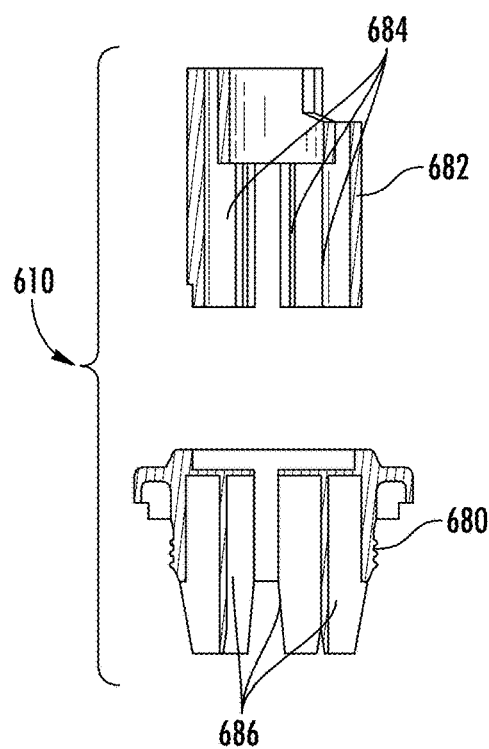
FIG. 28 is an enlarged exploded cross-sectional view of the locking mechanism components.

Similarly, another exemplary embodiment 500 is shown in FIGS. 21 and 22. The pump assembly 500 generally comprises a dispensing head 504, an accumulator cup 512 and closure ring 518, spring assembly 508 (with spring element 520 and upper loading cone 524) and piston seal 530 as previously described.

The locking structure 510 may comprise a polymer tear band 570 with a frangible reduced thickness area or frangible elements which allow removal of the band 570. As shown in FIG. 21, the band 570 is received between the closure ring 518 and the dispensing head 504 to prevent actuation before purchase.

Turning to FIGS. 23-28, another exemplary dispensing pump 600 is illustrated. The dispensing head 604, accumulator 612, closure ring 618, spring 608 (with spring element 620 and upper loading cone 624) and piston seal 630 components of the pump structure are similar as previously described, however, the locking structure 610 may comprise a chaplet 680 received within the closure ring 618 and locking lugs 682 formed around the piston stem 606 of the dispensing head 604. The chaplet 680 includes a plurality of slots 686 which cooperate with the lugs 682 to guide axial movement of the dispensing head 604 between the extended and actuated positions.

The dispensing head 604 is shipped in the extended position where the dispensing head 604 is rotated to a locked position. Detents 688 are provided in select peripheral locations to interlock and lock the dispensing head in the extended position. In this regard, the bottom of the lugs 684 engages the top of the walls forming the slots in the chaplet and the dispensing head cannot be actuated.

In use, the dispensing head 604 and the locking lugs 684 are rotated relative to the chaplet 680 from the locked position to an unlocked position where the lugs 684 can slide between the walls and within the slots 686.

While the various pump embodiments disclosed herein employ the described polymer compression spring element 120, it should be clearly understood that any of the pump embodiments may alternatively be constructed with a conventional metal coil spring or other spring and that the disclosed locking structures may be equally adopted and utilized in other types of dispensing pumps, including those utilizing metal springs.

It can therefore be seen that the exemplary embodiments provide unique and novel dispensing pump assemblies in which all the discrete components may be more easily recycled.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A dispensing pump comprising:
a pump base;
a dispensing head including a piston stem which is axially guided within the pump base between an extended position and a retracted position;
a spring assembly captured between the pump base and the piston stem biasing the dispensing head to said extended position; and
a releasable lock coupled between the pump base and the dispensing head, the releasable lock comprises:
a guide tube coupled between the spring assembly and the pump base, and a piston stem plug disposed at a terminal end of the piston stem, the piston stem plug slidably received within the guide tube and being slidably movable relative to the guide tube between a locked position when the dispensing head is retracted and a deployed position when the dispensing head is extended, said piston stem and piston stem plug being retained in the locked position by friction, and being retained in the deployed position by interfitting tabs.

2. The dispensing pump of claim 1 wherein the piston stem plug includes a sealing rim at a lower end thereof.

3. The dispensing pump of claim 1 wherein the pump base includes a closure ring, said releasable lock further comprising a frangible tear band releasably engaged between the closure ring and the dispensing head.

4. The dispensing pump of claim 2 wherein the pump base includes a closure ring, said releasable lock further comprising a frangible tear band releasably engaged between the closure ring and the dispensing head.

5. The dispensing pump of claim 1 wherein said piston stem plug includes an outwardly extending snap bead on a lower peripheral edge thereof, said snap bead engaging with a lower peripheral edge of said guide tube to retain the piston stem plug and piston stem in the locked position.

6. The dispensing pump of claim 1 wherein
said pump base includes an accumulator cup; and
said spring assembly comprises a slotted tubular spring element formed from a tensile polymer material;

a first loading cone formed at the bottom of said accumulator cup and receiving a first end of said slotted tubular spring element; and a second loading cone disposed on a terminal end of said guide tube and receiving a second end of said slotted tubular spring element.

7. The dispensing pump of claim 5 wherein said pump base includes an accumulator cup; and said spring assembly comprises a slotted tubular spring element formed from a tensile polymer material;

a first loading cone formed at the bottom of said accumulator cup and receiving a first end of said slotted tubular spring element; and a second loading cone disposed on a terminal end of said guide tube and receiving a second end of said slotted tubular spring element.

8. A dispensing pump comprising:

a pump base;

a dispensing head including a piston stem which is axially guided within the pump base between an extended position and a retracted position;

a spring assembly captured between the pump base and the piston stem biasing the dispensing head to said extended position; and a releasable lock coupled between the pump base and the dispensing head, wherein said pump base includes a closure ring and the releasable lock comprises a slotted tubular band captured between the closure ring and the dispensing head, said slotted tubular band releasably maintaining said dispensing head in said extended position.

9. The dispensing pump of claim 8 wherein said slotted tubular band comprises a paper material.

10. The dispensing pump of claim 8 wherein said slotted tubular band comprises a plastic material.

11. A dispensing pump comprising:

a pump base;

a dispensing head including a piston stem which is axially guided within the pump base between an extended position and a retracted position;

a spring assembly captured between the pump base and the piston stem biasing the dispensing head to said extended position; and a releasable lock coupled between the pump base and the dispensing head, wherein said pump base includes a closure ring and the releasable lock comprises a frangible tubular band captured between the closure ring and the dispensing head, said frangible tubular band releasably maintaining said dispensing head in said extended position.

12. The dispensing pump of claim 11 wherein said frangible tubular band comprises a plastic material.

13. A dispensing pump comprising:

a pump base;

a dispensing head including a piston stem which is axially guided within the pump base between an extended position and a retracted position;

a spring assembly captured between the pump base and the piston stem biasing the dispensing head to said extended position; and a releasable lock coupled between the pump base and the dispensing head, wherein said spring assembly comprises:

a slotted tubular spring element formed from a tensile polymer material; a first loading cone received at a first end of said slotted tubular spring element, said first loading cone being fixed relative to said pump base; and a second loading cone received at said second end of said slotted tubular spring element, said second loading cone being movable relative to said pump base.

14. A dispensing pump comprising:

a pump base including an accumulator cup and a closure ring;

a dispensing head including a piston stem which is axially guided within the closure ring between an extended position and a retracted position;

a spring assembly captured between the pump base and the piston stem biasing the dispensing head to said extended position; and a rotatable lock coupled between the pump base and the dispensing head, the rotatable lock comprises:

a plurality of axially extending guide lugs disposed on the piston stem;

a chaplet received within the closure ring, the chaplet including a plurality of axially extending guide slots for guiding axial movement of the dispensing head between said retracted and said extended positions, said dispensing head being rotatable relative to said chaplet between a locked position and an unlocked position, said guide lugs and the chaplet including mating surfaces which are engaged in the locked position and disengaged in the unlocked position.

15. A dispensing pump comprising:

a pump base including an accumulator having a dip tube port within a bottom wall, and further having a ball valve within said dip tube port, said pump base further including a closure ring securing said accumulator to a neck of a container;

a dispensing head including a piston stem which is guided within the pump base and has a terminal end which extends into the accumulator;

a piston seal received about the piston stem and forming a seal with inner walls of the accumulator;

a spring assembly comprising:

a slotted tubular spring element formed from a tensile polymer material; and first and second loading cones received at opposing first and second ends of said slotted tubular spring element, said first loading cone formed with said bottom wall of said accumulator, said second loading cone received at said terminal end of said piston stem and being movable with said dispensing head relative to said first loading cone; and a releasable lock coupled between the pump base and the dispensing head.

16. The dispensing pump of claim 15 wherein the releasable lock comprises:

a guide tube coupled between the spring assembly and the pump base, and a piston stem plug disposed at a terminal end of the piston stem, the piston stem plug slidably received within the guide tube and being slidably movable relative to the guide tube between a locked position when the dispensing head is retracted and a deployed position when the dispensing head is extended, said piston stem and piston stem plug being retained in the locked position by friction, and being retained in the deployed position by interfitting tabs.

17. The dispensing pump of claim 16 wherein said piston stem plug includes an outwardly extending snap bead on a lower peripheral edge thereof, said snap bead engaging with a lower peripheral edge of said guide tube to retain the piston stem plug and piston stem in the locked position.

\* \* \* \* \*